(12) United States Patent
Beck et al.

(10) Patent No.: US 6,837,553 B2
(45) Date of Patent: Jan. 4, 2005

(54) BRAKE CONTROL SYSTEM DEFINED BY FIELD PROGRAMMABLE GATE ARREY

(75) Inventors: Arnold A. Beck, Clinton, OH (US); James L. Hill, Clinton, OH (US); Ralph J. Hurley, Alliance, OH (US)

(73) Assignee: Aircraft Braking Systems Corporation, Akron, OH (US)

( * ) Notice: Subject to any disclaimer, the term of this patent is extended or adjusted under 35 U.S.C. 154(b) by 0 days.

(21) Appl. No.: 10/475,698
(22) PCT Filed: Feb. 25, 2003
(86) PCT No.: PCT/US03/05901

§ 371 (c)(1),
(2), (4) Date: May 10, 2004

(87) PCT Pub. No.: WO03/072408

PCT Pub. Date: Sep. 4, 2003

(65) Prior Publication Data
US 2004/0195914 A1 Oct. 7, 2004

Related U.S. Application Data
(60) Provisional application No. 60/359,867, filed on Feb. 25, 2002.

(51) Int. Cl.[7] .................................................. B62D 6/00
(52) U.S. Cl. ...................... 303/191; 303/113.1; 303/20; 303/3; 303/15
(58) Field of Search .............................. 303/191, 113.1, 303/3.15, 20

(56) References Cited

U.S. PATENT DOCUMENTS

| | | | | |
|---|---|---|---|---|
| 5,465,079 A | * | 11/1995 | Bouchard et al. | 340/576 |
| 6,356,819 B1 | * | 3/2002 | Winslow | 701/23 |
| 6,392,318 B1 | * | 5/2002 | Griffis | 307/125 |

* cited by examiner

Primary Examiner—Matthew C. Graham
(74) Attorney, Agent, or Firm—Renner, Kenner, Greive, Bobak, Taylor & Weber

(57) ABSTRACT

A brake control system for a wheeled vehicle includes a field programmable gate array configured to perform the algorithm of brake control subsystems in a typical brake control system for a wheeled vehicle. The brake control subsystems typically include anti-skid control, brake temperature monitoring, built-in tests, and, in the case of an aircraft, nose wheel steering. The system also includes wheel speed sensors, brake temperature monitors, brake valves and associated control circuits, and brake valve monitors respecting brake valve current and voltage. The use of field programmable gate arrays to configure a brake control system avoids the obsolescence and shortened life of control systems previously dependent upon microprocessors and the like.

8 Claims, 4 Drawing Sheets

BRAKE CONTROL SYSTEM DEFINED BY FIELD PROGRAMMABLE GATE ARREY

This application claims the benefit of Provisional Application No. 60/359,867, filed Feb. 25, 2002.

TECHNICAL FIELD

The invention herein resides in the art of electronic control systems and, more particularly, to control systems for aircraft brakes. Specifically, the invention relates to a brake control system defined by field programable gate arrays and application specific integrated circuits such as to provide a hardware implementation of a software based brake control/anti-skid algorithm, including brake-by-wire, automatic braking, and brake temperature monitoring. The invention is generally applicable to a broad range of control systems, of which aircraft brakes are simply an example.

BACKGROUND ART

The invention presented in detail herein is set forth with respect to an aircraft braking system and, more specifically, to the anti-skid control portion of such a braking system. The invention, however, contemplates adaptation to a broad range of controls in which field programmable gate arrays may be employed for purposes which will become apparent herein.

In the prior art of control systems, and particularly those for aircraft brakes, the control system was devised of circuitry comprising discrete components. Over a course of time, such aircraft brake control systems evolved to the implementation of dedicated microprocessors or electronic chips, such that the control system design was primarily software controlled and algorithm dependent. The market for electronic chips has been substantially consumer driven, with little thought to after-market support. Accordingly, the expected life for many electronic systems is on the order of five years. New high density, high speed components are expected to have operational lives on the order of about seven years. While this is happening "MIL-spec" parts are being removed from production. But, airframe manufacturers expect the avionics of the aircraft to last and be supported for the life of the aircraft—often on the order of thirty years or more.

Current market trends exacerbate the problem of obsolete parts. The avionics industry, and others as well, are thus driven to change the way they do business. While consideration may be given to life-time buys (purchasing and maintaining an adequate quantity of electronics parts to service the aircraft from the beginning), such an approach is both expensive and risky. Similarly, periodic redesigns to obtain the same functionality are costly and time consuming. A better approach is to embrace a new technology that is flexible and has a long period of projected availability.

Field Programmable Gate Arrays (FPGA), though not previously applied to control systems in general or braking systems in particular, have been found to be attractive to fit the avionics needs of the aircraft industry. It is presently anticipated that FPGA's are projected to be available for a long period of time. They are cost effective, they are both scalable and flexible in application, they involve a low to moderate risk factor, and they serve to reduce dependency on microprocessors that are given to obsolescence.

DISCLOSURE OF INVENTION

In light of the foregoing, it is a first aspect of the invention to provide a control system defined primarily by field programmable gate arrays in order to avoid the obsolescence and shortened life of such control systems previously dependent upon microprocessors and the like.

Another aspect of the invention is the provision of a brake control system defined by FPGA's, including all portions thereof previously dependent upon software or algorithm configurations.

Still a further aspect of the invention is the provision of a brake control system defined by FPGA's, in which all subsystems of the brake control system, such as anti-skid, nosewheel steering, brake temperature monitoring, built-in tests, and the like are all implemented through FPGA's or application specific integrated circuits (ASIC).

The foregoing and other aspects of the invention which will become apparent as the detailed description proceeds are achieved by a brake control system for an aircraft in which the various subsystems and components thereof, such as filters, integrators, amplifiers and the like are all replicated by FPGA's which thereby provide a hardware implementation of what was previously configured in software in prior systems.

Other aspects of the invention are attained by a brake system for a wheeled vehicle comprising: a field programmable gate array configured to perform an algorithm of brake control subsystems taken from the group comprising anti-skid control, nosewheel steering, brake temperature monitoring, and built-in tests; a wheel speed interface interposed between wheel speed transducers of said wheeled vehicle and said field programmable gate array for presenting signals to said field programmable array corresponding to instantaneous wheel speed; and a brake temperature interface interposed between brakes of said vehicle and said field programmable gate array and providing signals corresponding to brake temperature.

DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
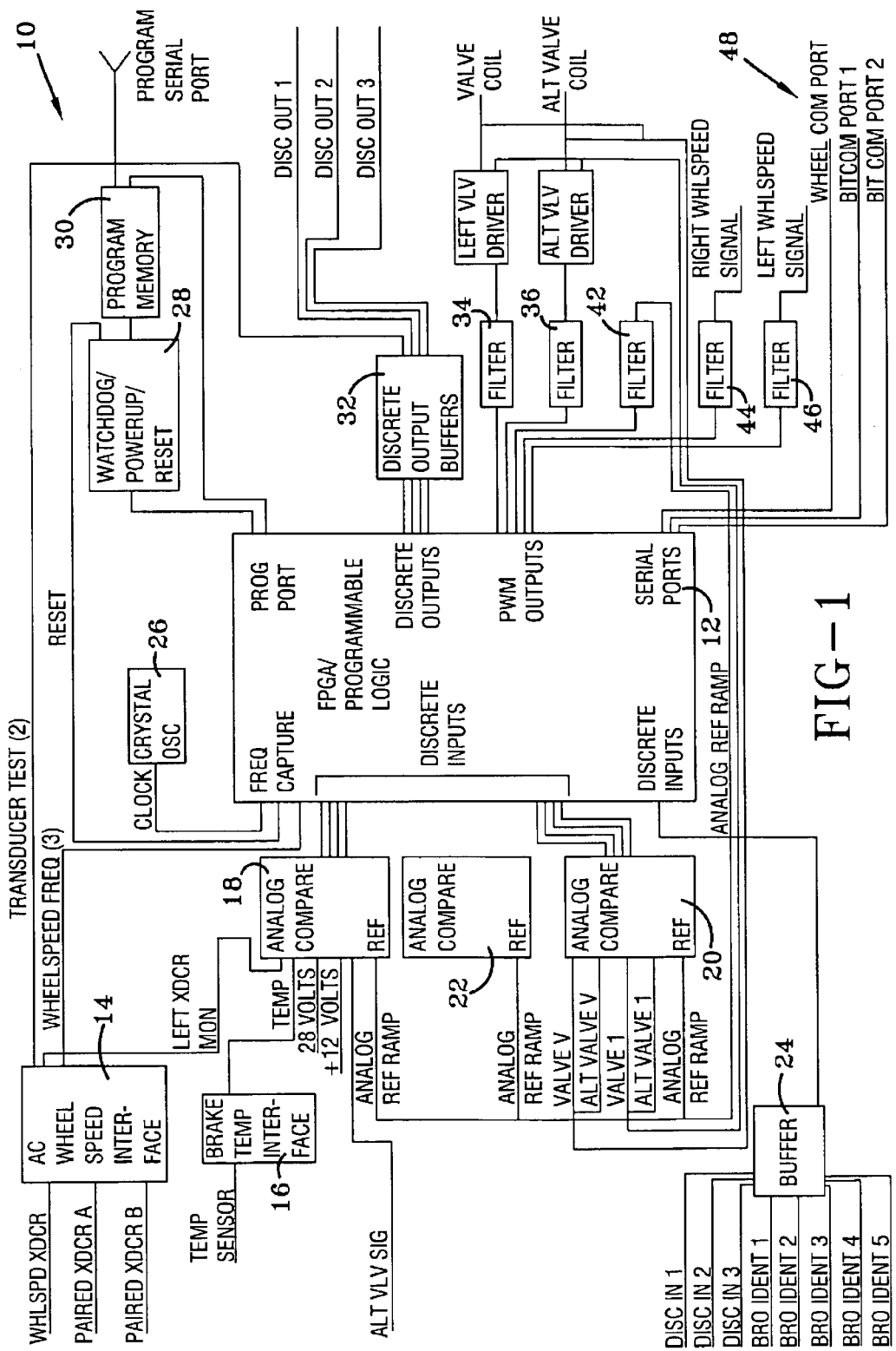
FIG. 1 is a block diagram of a brake control system made in accordance with the invention.

Referring now to the drawings and more particularly to FIG. 1, it can be seen that a brake control system made in accordance with the invention is designated generally by the numeral 10. Again, while the concept of the invention is described in the context of an aircraft brake control system, it will be appreciated that the general concept is applicable to a broad range of control structures.

At the heart of the brake control system 10 is a field programmable gate array (FPGA) 12, which is of sufficient size to accommodate the functions to be performed by the brake control system 10. A wheel speed interface 14 is interconnected between wheel speed transducers and the FPGA 12 to provide wheel speed signals of a frequency corresponding to instantaneous wheel speeds in a manner well known and understood by those skilled in the art. Similarly, a brake temperature interface 16 may be interconnected to an appropriate temperature sensor such as thermocouple, thermistor or the like, to receive signals corresponding to brake temperature. The output of the brake temperature interface 16 is provided to an appropriate analog comparator 18 which serves as a brake temperature monitoring system, providing outputs to the FPGA 12, as shown.

A second analog comparator 20 is interconnected with anti-skid brake valves to monitor the valve voltage and valve current and to provide corresponding outputs relevant thereto to the FPGA 12, as shown. A third analog comparator 22 is shown for such other monitoring functions as might be desired. Those skilled in the art will appreciate that the monitoring of valve voltages and currents, as well as brake temperature is a common and necessary undertaking in most brake control systems, the comparator 22 being provided for such additional monitoring as may be desired.

A buffer 24 is provided to receive external signals such as a weight on wheels signal or the like to provide such inputs to the FPGA 12 as desired.

A clock 26 and watchdog timer 28 are provided in association with the FPGA 12 for purposes of synchronous operation and timing. A program memory input 30 is interconnected to a program serial port for programming of the FPGA 12 to operate in accordance with a desired algorithm. The programming of FPGA's is well known and understood by those skilled in the art and, once the appropriate transfer functions are established, may be readily implemented.

An array of discrete output buffers 32 is provided for monitoring control matters such as wheel speed as determined from transducer interface 14, or further monitoring wheel spin-up signals and the like from external sources. The valve control signals are pulse width modulation outputs of the FPGA 12 and are provided through filters 34,36 and appropriate valve drivers 38, 40 to the anti-skid valves in the embodiment shown. The outputs of the valve drivers are introduced as the valve voltage and current signals applied to the analog comparator 20. Similarly, the pulse width modulated output from the FPGA 12 is passed through the filter 42 and to the various analog comparators 18, 20, 22 to establish the referenced analog ramp signal to be employed by such comparators in their operative modes.

Filters 44, 46 receive outputs from the FPGA 12 corresponding to the wheel speed signals of associated wheels and pass those signals to peripheral equipment as desired. Similarly, outputs from serial ports of the FPGA 12 are passed to appropriate peripheral equipment such as built-in test equipment and the like.

Fundamentally, it should be appreciated that FIG. 1 provides the overall structure of a brake control system, with the FPGA 12 serving to perform the algorithm of the various subsystems thereof. One such subsystem is the anti-skid system, shown in FPGA simulation in FIG. 2 and designated generally by the numeral 50. As shown, the wheel speed signal pulses from the interface 14 are applied to a frequency to digital converter 52 and then passed through a low pass filter 54 to rid the signal of noise. A second notch filter 56 further refines the signal by eliminating or rejecting signal frequencies attributed to the natural strut frequency of the associated wheel. A threshold comparator or drop-out circuit 58 receives the filtered wheel speed signal and blocks any such signals indicative of wheel speed below a certain threshold. As is well known to those skilled in the art, it is generally desired that anti-skid operation be precluded below a particular velocity threshold such as, for example, 16.9 feet per second.

When operating above the drop out threshold, the filtered wheel speed signal passes from the circuit 58 to a high pass filter 60 that operates as a differentiator to generate a signal corresponding to wheel deceleration. That signal is then passed to a second high pass filter 62 which, operating as a differentiator, generates the second derivative of wheel speed, the same being a signal corresponding to the rate of change of deceleration. Those skilled in the art will appreciate that the output of the second high pass filter 62, corresponding to the rate of change of deceleration, is employed to anticipate skids by the associated wheel. A limiter circuit 64 responds to the output of the high pass filter 62 and limits the output thereof such that the anti-skid system responds only to the initiation of the second derivative output from the circuit 62, such that the second derivative is an initiating, but not a driving force in the anti-skid operation.

The output of the limiter 64 is passed, along with the output of the modulator 72 to a summing circuit 66, the output of which is the instantaneous average of the wheel speed signal. The output of the summing circuit 66 passes through a non-linear gain control circuit 68 an then to the multiplexer 70, the output of which passes to the valve driver of the anti-skid valve.

Also included as part and parcel of the anti-skid FPGA simulation 50 is a skid detector 74, receiving the filtered wheel speed signal from the notch filter 56. As will be appreciated by those skilled in the art, the skid detector 74 detects instantaneous large changes in wheel speed, identifies the same, and passes such signals to the multiplexer 70 for and instantaneous release of brake pressure, if necessary. The output of the skid detector 74 is also passed to the modulator 72 to charge the modulator which, as is known to those skilled in the art, is an integrator establishing an output signal, applied to the anti-skid valve, corresponding to the average skid activity of the associated wheel. In this regard, the output of the skid detector 74 is passed through staged gain control circuits 76 to the modulator 72. A timer 78 is interposed to delay any transfer of signals which might be attributed to strut reaction to braking activity from the first differentiator to the modulator 72 immediately after the skid detector turns off. In other words, the timer 78 allows a delay in signal transfer sufficient to allow strut reactions to damp out following skid recovery.

Also provided as part and parcel of the anti-skid FPGA simulation 58 is a high pass filter 80, receiving the deceleration output signal of the high pass filter 60. This filter 80 serves to pass all signals except those that have a relatively constant value. The output of the filter 80 is passed from a second order low pass filter 80a to a rectifier 82 such that the output thereof is a rectified signal (absolute value) corresponding to changes in wheel speed deceleration. The pulses of the rectified signal are passed to a peak detector 84 in which sequential data pairs are compared, and the maximum held. The output of the peak detector 84 is passed to the summer 86 and thence to the modulator 72. Thus, it will be appreciated that the anti-skid circuit 58 receives a multitude of signals corresponding to skidding activity of the associated aircraft wheel. An on/off signal is received from the skid detector 74, an integrated or average signal is received from the modulator 72 and an anticipatory or derivative signal is received from the differentiators 60, 62.

Figure 2:
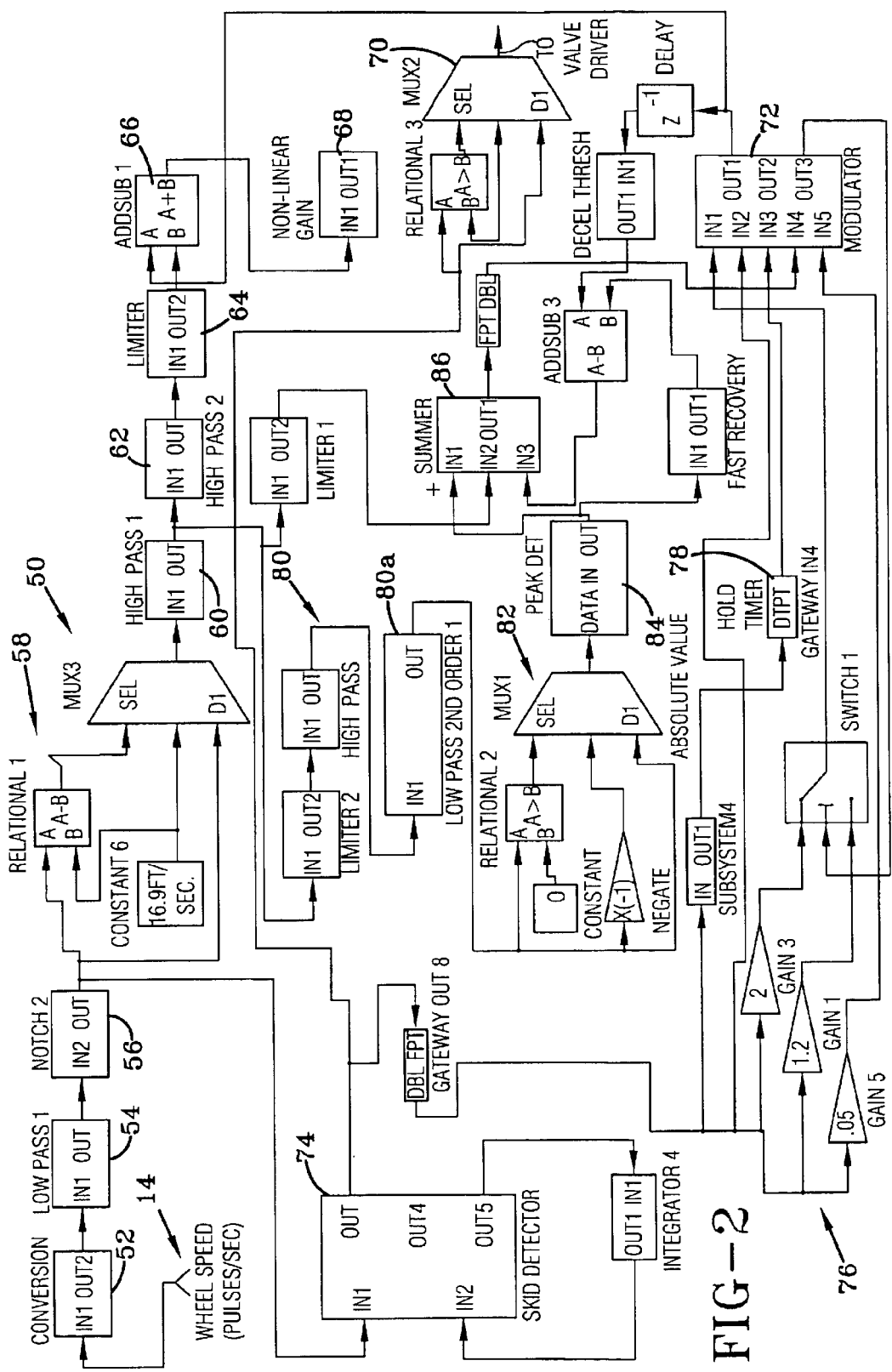
FIG. 2 is a circuit schematic of the anti-skid simulation of the control system of FIG. 1.
Figure 3:
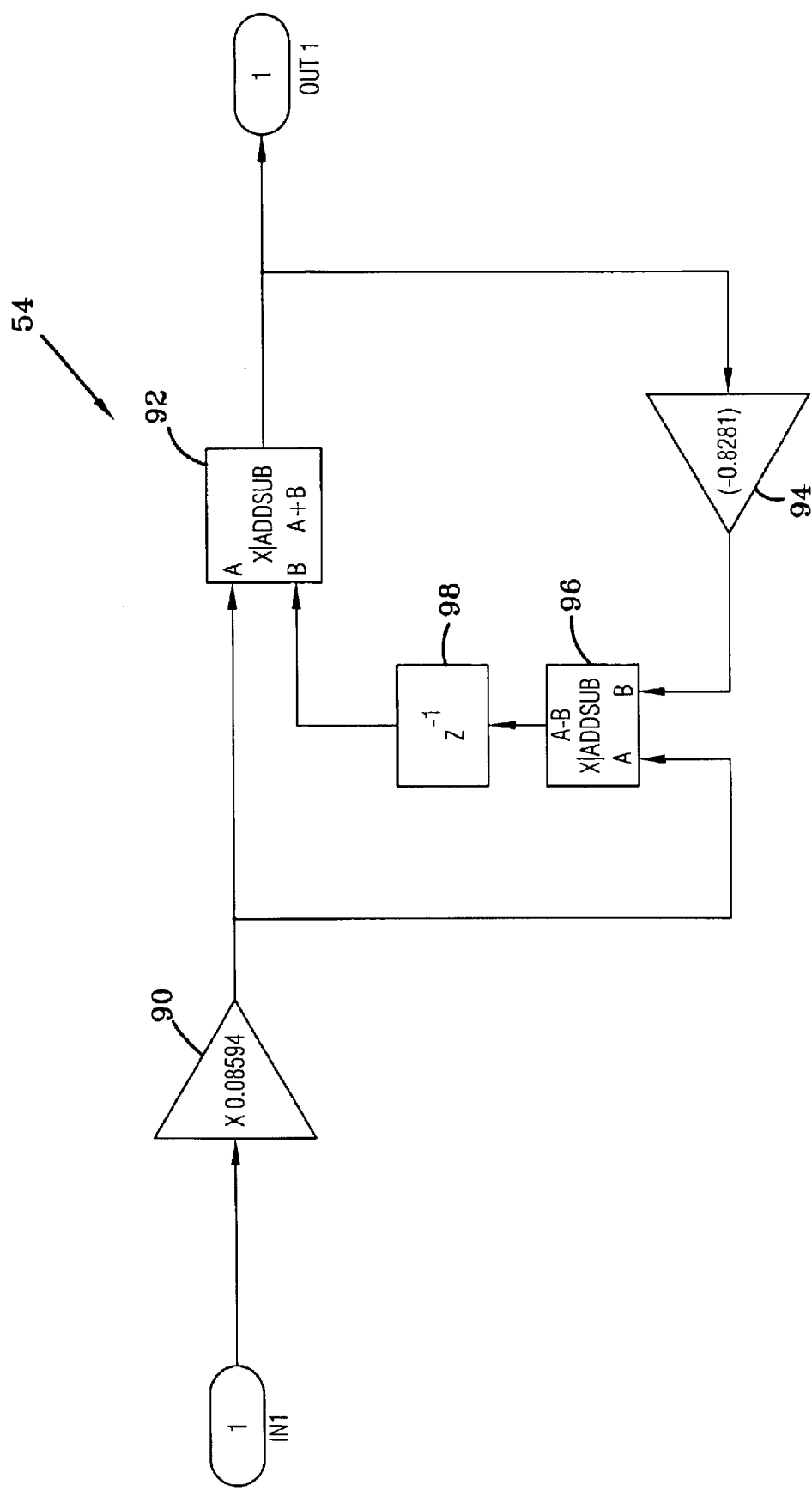
FIG. 3 is a schematic diagram of the FPGA design of a low pass filter employed in the subsystem of FIG. 2.

Consistent with the concept of the instant invention, the anti-skid control algorithm 58 of FIG. 2 is reduced to field programmable gate array implementation by employment of appropriate transfer functions which should be perceived by those skilled in the art of FPGA technology. With reference to FIG. 3, it can be seen that the low pass filter 54 may be defined by FPGA simulation in the manner depicted in FIG. 3. The low pass filter 54 includes a multiplier or amplifier 90 interconnected to an adding circuit 92, the output of which is fed back through an amplifier 94 to a subtracting circuit 96, the output of which passes through a sample period delay circuit 98 and is then fed to the summer or adding circuit 92. Those skilled in the art will appreciate that FIG. 3 presents the block set for the low pass filter 54 which, when appropriately scaled in accordance with the desired transfer function, will allow the FPGA 12 to be properly routed to perform the low pass filter function.

Figure 4:
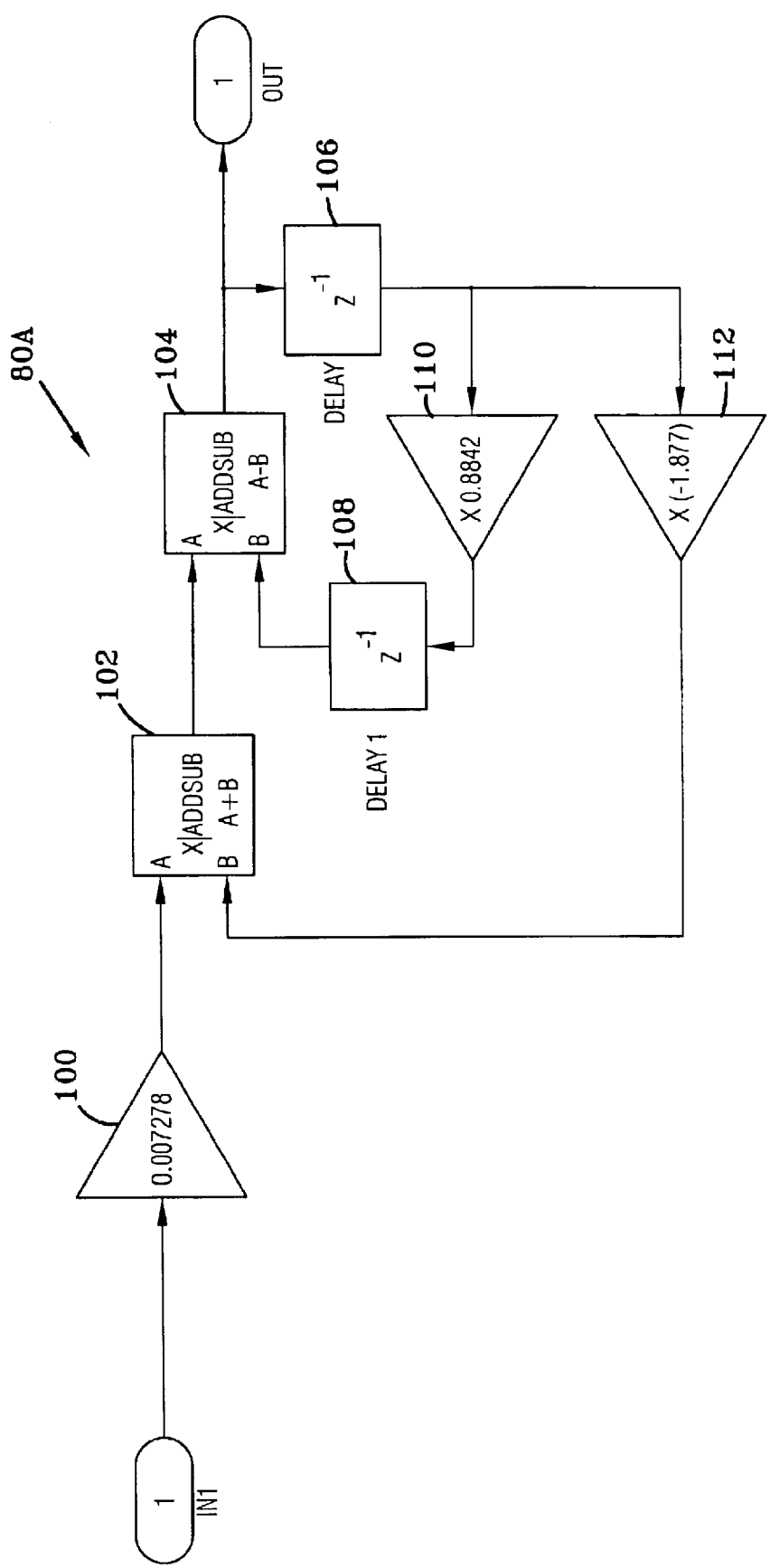
FIG. 4 is a schematic diagram of the FPGA implementation of a second order low pass filter employed in the embodiment of FIG. 2.

The block set 70 for the second order low pass filter 80a of FIG. 2 is shown in FIG. 4. The input passes to a multiplier or amplifier 100 which passes to an adder or summing circuit 102, the output of which passes to a subtracting circuit 104 which includes a feedback circuit of sample delays 106, 108 and multiplier or amplifier 110. A second feedback circuit interconnects the output of the substracter 104 and the adder 102 through the sample delay 106 and amplifier or multiplier 112. Again, those skilled in the art will appreciate that implementation of appropriate scaling and transfer functions will allow the FPGA 12 to be properly routed to perform the functions set forth in FIG. 4 to achieve the desired second order low pass filter configuration.

Each of the various functions of the anti-skid simulation of FIG. 2 may be reduced to a block set with appropriate scaling and transfer functions to allow for the appropriate routing of the FPGA 12 to perform the associated functions. Accordingly, the entirety of the anti-skid function of FIG. 2 can be incorporated into the structure of the FPGA 12. In like manner, other subsystems of the brake control system 10 can be similarly reduced to an FPGA implementation, such as nose wheel steering, automatic braking, brake temperature monitoring, and the like.

Thus it can be seen that the objects of the invention have been satisfied by the structure presented and described above. The algorithms of the brake control system can be reduced to the desired scaling and transfer functions necessary to implement an FPGA routing to accomplish the necessary function, thereby alleviating the need for discrete components or electronic chips given to obsolescence.

What is claimed is:

1. A brake control system for a wheeled vehicle, comprising:

a field programmable gate array configured to perform an algorithm of brake control subsystems taken from the group comprising anti-skid control, nosewheel steering, brake temperature monitoring, and built-in tests;

a wheel speed interface interposed between wheel speed transducers of said wheeled vehicle and said field programmable gate array for presenting signals to said field programmable array corresponding to instantaneous wheel speed; and a brake temperature interface interposed between brakes of said vehicle and said field programmable gate array and providing signals corresponding to brake temperature.

2. The brake control system according to claim 1, further comprising a comparator interposed between anti-skid brake valves and said field programmable gate array, said comparator providing signals to said field programmable gate array corresponding to anti-skid brake valve current and voltage.

3. The brake control system according to claim 2, wherein said field programmable gate array provides brake control signals to said anti-skid valves.

4. The brake control system according to claim 2, wherein said field programmable gate array provides brake control signals to said anti-skid valves.

5. The brake control system according to claim 1, wherein said anti-skid control subsystem comprises:

a frequency to digital converter receiving wheel speed signals and passing said wheel speed signals through low pass and notch filters, generating filtered wheel speed signals;

first and second interconnected differentiators receiving said filtered wheel speed signals, generating first and second derivatives of wheel speed.

6. The brake control system according to claim 4, wherein said anti-skid control system further comprises a limiter connected to said first and second interconnected differentiators for limiting the signal corresponding to the second derivative of wheel speed.

7. The brake control system according to claim 5, wherein said anti-skid control system further comprises a modulator operatively connected to an anti-skid valve driver and providing thereto an instantaneous average wheel speed signal.

8. The brake control system according to claim 6, wherein said anti-skid control system further comprises a skid detector passing output signals corresponding to instantaneous large changes in wheel speed to said anti-skid brake control valve driver and said modulator.

* * * * *